Aug. 5, 1941.　　　E. A. BANSCHBACH　　　2,251,699
AUTOMOBILE CROSSING BARRIER
Filed July 24, 1937　　　2 Sheets-Sheet 1
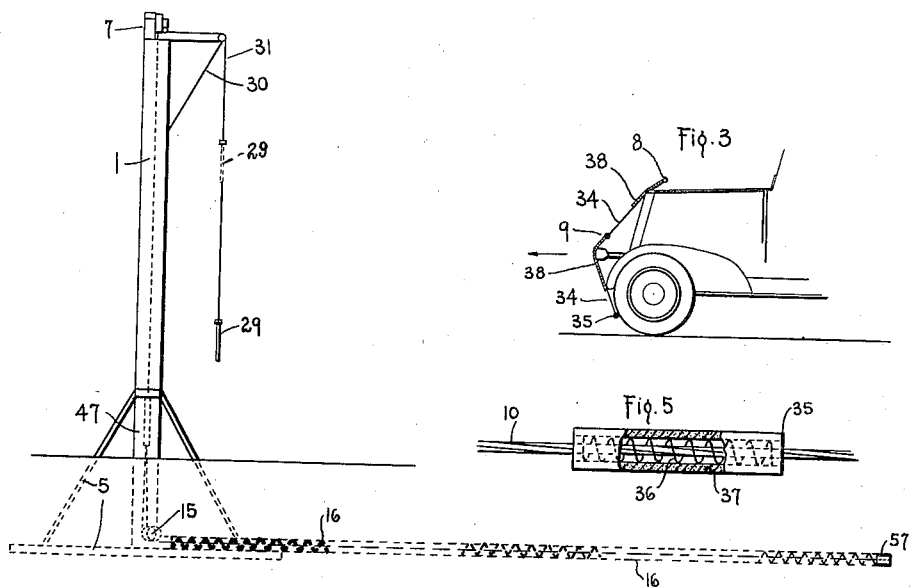

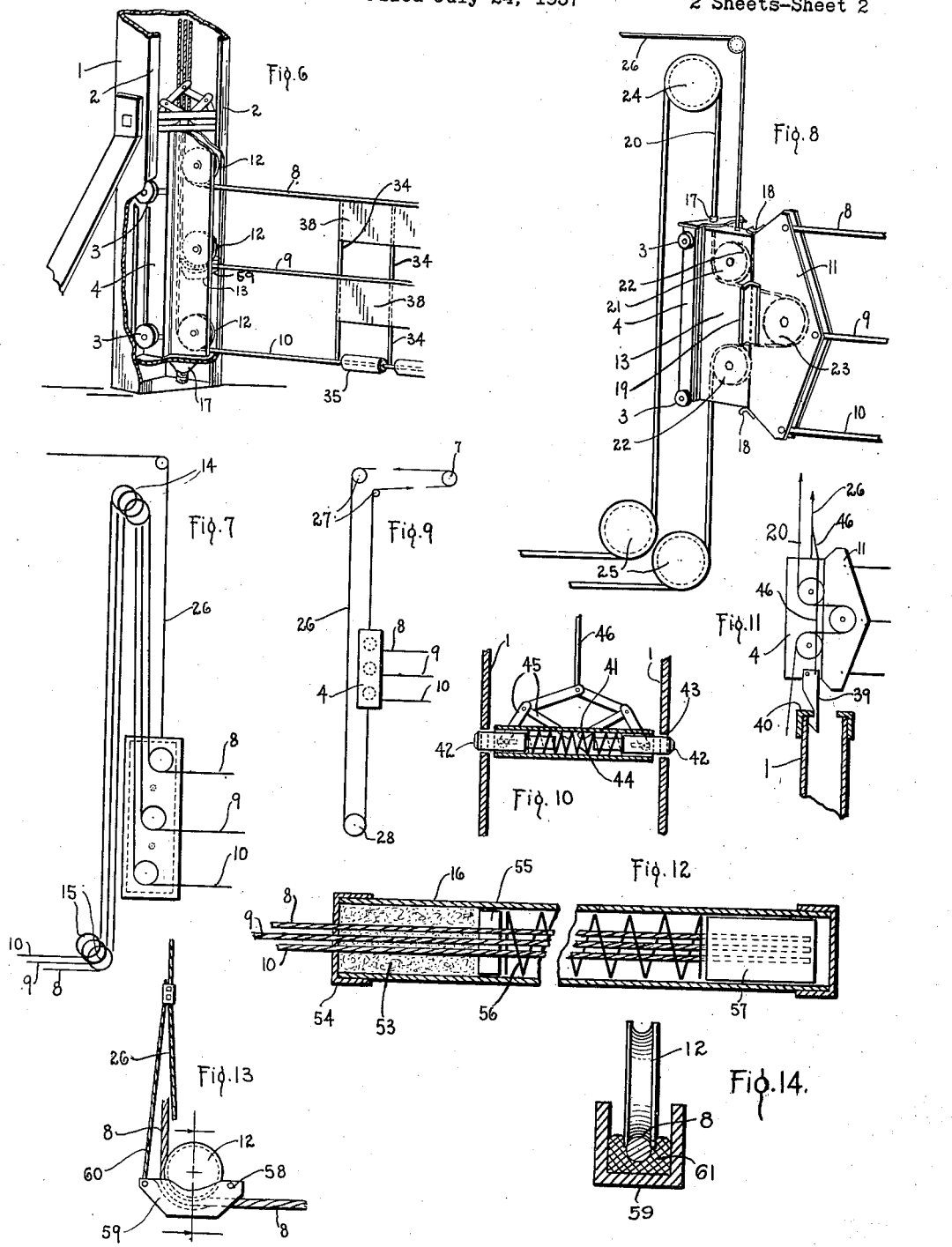

Patented Aug. 5, 1941

2,251,699

UNITED STATES PATENT OFFICE 2,251,699

AUTOMOBILE CROSSING BARRIER

Edward A. Banschbach, Madison, Wis.

Application July 24, 1937, Serial No. 155,421

11 Claims. (Cl. 39—1)

This invention relates in general to an obstruction in, on or across a roadway, and has more particular reference to a safety gate placed in the pathway of a vehicle and adapted to protect a vehicle and its occupants, and also to prevent them from passing the gate or obstruction when it is in closed position.

An important object of the invention is in the provision of a safety gate or highway obstruction which may be placed in the pathway of a vehicle, such as an automobile, which will arrest and finally stop it without undue violence either to the car or its occupants.

The invention consists further in the novel construction, combination and arrangement of the several parts.

In the accompanying drawings:

Fig. 1 is an elevation of a safety gate constructed in accordance with the principles of this invention;

Fig. 2 is a side elevation of the gate;

Fig. 3 is a fragmentary view showing the impact of an automobile front with the flexible roadway barrier;

Fig. 4 is a sectional view of a cable lubricator;

Fig. 5 is a view partly in section of a flexible impact member for the roadway barrier;

Fig. 6 is a perspective of one end support of a flexible roadway barrier;

Fig. 7 is a somewhat diagrammatical representation to show the action of the cables for the barrier of Fig. 6;

Fig. 8 shows a cable operating mechanism for a barrier as shown in Fig. 1;

Fig. 9 is a diagrammatic view to show the operation of a barrier in opposite directions by a single motor;

Fig. 10 is a sectional detail of the supporting column locking means;

Fig. 11 is a somewhat diagrammatic view illustrating the modification of the barrier locking means;

Fig. 12 is a sectional detail showing the tensioning cable lubricating means;

Figs. 13 and 14 are side and sectional views respectively of a tension cable locking means.

In providing a rigid barrier for automobiles which may be traveling at high speed, it is impossible to stop the vehicle suddenly without damaging it or the barrier. The present invention is therefore designed to provide a yielding barrier in which the yielding action itself may be graduated to oppose the extension of the gate against the impact of small vehicles and to provide greater opposition for larger and heavier vehicles.

Referring now more particularly to the drawings, a pair of supporting posts 1 are mounted at opposite sides of a roadway, and each preferably comprises a sheet metal structure of channel form as shown in Fig. 6, with inwardly turned edges 2 for structural strength, and to provide an inside track for the wheels 3 of a gate carrier 4 vertically movable therein. Each post is solidly mounted and supported by braces 5 so that it will withstand considerable strain.

Across the top the posts are preferably connected by a metal frame 6 which may support a motor 7 for operating the gate and a signal device.

The gate comprises a plurality of cables 8, 9 and 10, preferably of stranded wire rope having great strength and flexibility. These cables may be attached at each of the ends to an end plate 11 as shown in Fig. 8, or they may be of greater length passing over the pulleys or sheaves 12 rotatably mounted in a holder 13 which is pivoted on a upright axis in the carrier 4, the cables then passing upwardly over sheaves 14 in the top of each post 1 and downwardly therein over sheaves 15 at the bottom of the post and below the roadway where they extend into a longitudinally extending spring pressure pipe 16 located at the side of the roadway.

If the cables terminate in an end plate as shown in Fig. 8, a holder 13 is mounted on pivots 17 and the end plate when seated against the holder, is held in alignment by upper and lower brackets 18 and by side brackets 19 for pivoting movement therewith. A single cable 20 passes over upper and lower sheaves 21 and 22 in the holder 13 and around a sheave 23 in the end plate 11, one portion of the cable passing over an upper sheave 24 at the top of the post and thence downwardly and the lower extremities of the cable passing over the lower sheaves 25 and then being connected to a spring tensioning structure 16 as shown in Fig. 2. For either of these forms there is a cable 26 which extends through the upper end of the post and to the driving motor 7 for raising the gate, and for positively raising and lowering the gate the cable is attached to the top and bottom of the carrier as shown in Fig. 9, passing over sheaves 27 and 28 at the top and bottom of the posts and the movement depending upon the operation of the motor 7 in opposite directions.

A safety signal 29 is also mounted on brackets 30 by means of cables 31 which are connected to a larger winding drum 32 of the motor 7 than a winding drum 33 to which gate moving cables 26 are attached. When not in use both the signal and gate are in raised position as shown in broken outline in Fig. 2, and the connection of the cables 31 and 26 to the winding drums is such that when the barrier is operated the signal gate being connected to the larger drum is operated more quickly to the lowered position, and as the barrier gate continues to lower the cables 31 of the signal gate is rewound in the opposite direction on its winding drum 32 raising the signal gate. When the motor is reversed to raise the barrier gate, the signal gate is first lowered, and when the gate is about halfway up the signal gate is in the lowermost position, and as the barrier gate continues to rise, the signal gate will be raised by the reverse rotation of its cable 31 on its winding drum 32.

The barrier gate comprises a plurality of short cross-connecting cables 34 attached to the main cables 8, 9 and 10. Between adjacent short cables on the bottom cable 10 are rotatable buffers 35 preferably comprising a flexible coiled wire 36 as shown in Fig. 5 enclosed in a casing or cover 37 of flexible material such as a short section of hose. The object of this structure is to prevent the lower cable from engaging or damaging any portion of a vehicle and also to prevent the cable from impinging or engaging the tire of a vehicle as illustrated by Fig. 3 and being drawn downwardly by contact therewith. The flexible rotating buffer members 35 will allow contact with the wheel but the rotation of the buffer will prevent the cable 10 and the gate from being drawn downwardly by or under the wheels.

Also extending lengthwise of the barrier gate and supported by the cross pieces 34 are flexible bands 38 preferably of heavy wear-resisting material such as belting and having considerable structural strength to oppose the impact of a vehicle and located as shown more clearly in Fig. 3 at heights to engage the bumper of a vehicle and also over the top of the radiator of an automobile vehicle so that there will be as little damage or injury to the vehicle as possible.

When the barrier gate is in lowered position the contact of a heavy vehicle therewith tends to compress the tension springs in the pipe 16 which might be sufficient to force the carrier 4 upwardly, and a lowering device is therefore provided herewith comprising a latch 39 pivoted to the carriage as shown in Fig. 11 and adapted to engage a fixed catch 40 at the bottom of the post or a transverse cylinder 41 (see Fig. 10) may be mounted at the upper end of the carriage, having pins 42 projecting from the ends and adapted to engage the openings 43 at the opposite sides of the post 1 and urged in such engaging position by an intermediate spring 44. These locking pins 42 are connected to a toggle mechanism 45 operated by a lifting cable 46, the latch 39 being operated by a similar lifting cable 46 which is attached to the main lifting cable 26. When the carrier 4 is lowered, the lifting cable 26 becomes slacked in the lowered position of the gate so that the latch 39 or the latch pins 42 will engage the post, but the first tightening movement of the cable 26 taking up the slack therein tightens the auxiliary lifting cable 46 and automatically releases the latches and allows the carrier to be raised.

In order that lifting cables of the type used may be kept in lubricated condition a cable lubricator 47 as shown in Fig. 4 is preferably installed in the supporting post for each cable. It comprises a shell 48 supported by end brackets 49 which are attached to the posts, a cable passing through the shell and through lubricating material 50 therein. As the material is worn away or taken up by the cables a follower 51 near one end of the shell is pressed inwardly by a spring 52, keeping the lubricating material in place.

A similar lubricating device may be incorporated as a part of the pressure pipe 16, comprising lubricating material 53 retained at one end by a cap 54 through which the cables pass, and by a follower 55 at the other end and engaged by one of the impact resisting springs 56. The ends of the cables 8, 9 and 10 are imbedded or sealed together in a block 57 at one end of the pipe 16 and they pass through a spring of varying thickness and therefore of varying intensity or a plurality of graduated springs as represented in Fig. 2.

When the gate is raised the tension of the springs acting upon the cables 8, 9 and 10 is at a minimum and in order to prevent the cables and gate from sagging between the posts, a friction lock is provided as shown more clearly in Fig. 13, in connection with each of the sheaves 12, which is mounted in the holder 13 by means of a pivot 58 at one end, comprising a U-shaped plate or trough 59 disposed below each of the sheaves 12 and having a tensioning rope 60 at the other end connected to the carrier hoisting cable 26 so that it is operated thereby. Positioned in the tensioning member 59 is frictional engaging material 61 which is brought tightly into engagement with the cable 8, forcing it in binding engagement with the sheave 12 when the gate is raised to overhead position by the gate-raising cable 26. In lowered position, where it is desired to provide a free run of the cables around the sheaves 12 the positioning of the gate in its lowered position reduces the tension of the cable 60 and drops the tensioning member 59 to such a point that the cables will run freely over their surfaces.

When the gate is lowered it is locked in position, the cables are free to run on their surfaces, and when the impact of any vehicle with the barrier gate is sufficient, the gate comprising the cables will be bowed in the center against the cable tensioning springs 56 to an extent proportionate to the impact thereby flexibly arresting the vehicle and gradually bringing it to a definite stop. In fact, the action of the tensioning spring tends to straighten the cables between the posts and to return the vehicle if it has been stopped.

This gate may be controlled automatically by an advance road contact plate, or it may be manually operated. When used as a barrier for railways, bridges or the like, it is usually controlled manually, and when used in street intersections, it may be controlled automatically.

I claim:

1. A roadway barrier, comprising upright columns set into the ground at the sides of the road, a gate extending across the road and movably mounted in the columns, cables connected to the ends of the gate and movable over pulleys in the columns, and graduated spring means at the bottom of the columns connected with the cables to increasingly oppose the impact of vehicles with the gate.

2. In a roadway barrier, a flexible gate having means mounting it for raising and lowering movement, said means comprising upright columns and flexible cables movable over pulleys in the columns and attached to the ends of the gate, and graduated spring means to which the other ends of the cables are attached allowing the gate to flex upon impact of a vehicle and including spring sections for increasingly opposing such flexing and impact.

3. In a roadway barrier, a gate mounted at the sides of the road for raising and lowering, a signal gate also extending across the roadway, and means to first lower and then raise the signal gate whenever the other gate is being lowered.

4. In a roadway barrier, upright columns at the sides of the road having a connection at the tops above the road, a barrier gate mounted at its ends for raising and lowering movement in the columns, a signal gate suspended from said connection, and power means for raising and lowering both gates and for lowering and raising the signal gate during the full lowering movement of the barrier gate and also during the full raising movement thereof.

5. In a yielding roadway barrier, supports at the sides of the road, a gate movable vertically in the supports, motive means including lifting cables connected to the ends of the gate, sectional spring means connected to the ends of the gate for increasing tension in stages upon said gate as the impact upon the gate is increased, and latch means on the gate released by the lifting cables for automatically engaging the supports when the gate is lowered.

6. In a roadway barrier, a gate, a pair of side supports for raising and lowering the gate, the gate comprising end plates and flexible cross cables, and spring pressed tension cables extending vertically in the supports and connected to the end plates and normally holding them adjacent the supports but allowing their separation when the gate is subject to impact and the cross cables are flexed as a result thereof.

7. In a roadway barrier, a flexible gate comprising a plurality of cables to extend across a road, a plurality of buffers for the cables, each buffer comprising a coiled spring wire surrounding the cable and a flexible cover for the wire, each buffer being rotatable on the cable and flexible longitudinally to bend with the cable.

8. In a roadway barrier, supporting side columns, a gate comprising flexible cables to extend across the road between the columns, means to raise and lower the gate including cables and sheaves in the columns over which they pass for supporting the gate in raised position, and a cable lock comprising a member pivoted at one end below a gate tensioning cable sheave and frictional material in the member to engage the gate tensioning cable, the other end of the member having a tensioning rope connected to the gate raising cable for tightening the gate tensioning cable lock when the gate is raised to prevent it from sagging between the columns.

9. In a roadway barrier, a pair of hollow side supports, carriers movable vertically therein, a gate comprising end plates and means to hold and vertically pivot them in the carriers, means to raise and lower the carriers, the gate having flexible cables which are deflected and drawn forwardly by vehicle impact, and tension cables connected around sheaves in the end plates and carriers and having spring tensioning means connected thereto for permitting a separation of the carriers and end plates under impact and for resiliently returning them to engaging position.

10. In a roadway barrier, a flexible vehicle engaging gate, and an advance flexible warning sign, power means for operating the gate and sign, the warning sign, the sign being operated simultaneously, said means being also operative to move the sign at greater speed than the gate to position it in the path of a vehicle and to withdraw it when the gate is positioned and said means also positioning it in the path of a vehicle as the gate is being withdrawn from engaging position.

11. In a roadway barrier, upright side columns and flexible gate transverse stop means movable in the columns from a raised position into the path of a vehicle, and means comprising a cable attached to the stop means and extending over pulleys in the top and bottom of the column, the cable having spring means comprising sections of graduated resistance extending from the bottom of the column and attached to the end of said cable, and said sections operable in succession by impact of a vehicle with the gate for compressing, resiliently arresting and gradually bringing a vehicle to a stop, the operation of the sections depending upon the weight and impact of the vehicle.

EDWARD A. BANSCHBACH.